United States Patent
Moriizumi et al.

(10) Patent No.: US 11,420,580 B2
(45) Date of Patent: Aug. 23, 2022

(54) INSTRUMENT PANEL AND METHOD FOR MANUFACTURING INSTRUMENT PANEL

(71) Applicant: HONDA MOTOR CO., LTD., Tokyo (JP)

(72) Inventors: Taiki Moriizumi, Tochigi-ken (JP); Atsushi Hanaoka, Tochigi-ken (JP); Mitsuaki Sakaguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/262,241

(22) PCT Filed: Jul. 25, 2019

(86) PCT No.: PCT/JP2019/029277
§ 371 (c)(1),
(2) Date: Jan. 22, 2021

(87) PCT Pub. No.: WO2020/031727
PCT Pub. Date: Feb. 13, 2020

(65) Prior Publication Data
US 2021/0155193 A1 May 27, 2021

(30) Foreign Application Priority Data
Aug. 6, 2018 (JP) .............................. JP2018-147539

(51) Int. Cl.
*B60R 21/205* (2011.01)
*B60R 21/2342* (2011.01)
*B62D 65/14* (2006.01)

(52) U.S. Cl.
CPC ........ *B60R 21/205* (2013.01); *B60R 21/2342* (2013.01); *B62D 65/14* (2013.01)

(58) Field of Classification Search
CPC .............. B60R 21/205; B60R 21/2342; B60R 21/2165; B62D 65/14; B60K 37/00
See application file for complete search history.

(56) References Cited

U.S. PATENT DOCUMENTS

| | | | |
|---|---|---|---|
| 2016/0137154 A1* | 5/2016 | Sasu | B60R 21/2165 280/728.3 |
| 2018/0037188 A1* | 2/2018 | Ohno | B60R 21/205 |
| 2020/0031036 A1 | 1/2020 | Moriizumi et al. | |

FOREIGN PATENT DOCUMENTS

| | | | | |
|---|---|---|---|---|
| CA | 3038238 A1 * | 4/2018 | ......... | B29C 45/1639 |
| DE | 102007046212 A1 * | 4/2009 | .......... | B60R 21/205 |
| EP | 0791508 | 8/1997 | | |

(Continued)

OTHER PUBLICATIONS

International Search Report and Written Opinion for International Application No. PCT/JP2019/029277 dated Oct. 1, 2019, 10 pages.

*Primary Examiner* — Drew J Brown
(74) *Attorney, Agent, or Firm* — Amin, Turocy & Watson, LLP

(57) ABSTRACT

Provided are: an instrument panel capable of stably deploying a deployment part; and a method for manufacturing the instrument panel. An instrument panel is provided with: a base part; and a deployment part which is surrounded by the base part, faces an air bag, and includes a tear line, wherein a slit structure including a plurality of slits arranged so as to surround the tear line is formed in the deployment part.

4 Claims, 9 Drawing Sheets

(56) References Cited

FOREIGN PATENT DOCUMENTS

| | | |
|---|---|---|
| JP | 09-226413 | 9/1997 |
| JP | 2006-188134 | 7/2006 |
| JP | 2014-113883 | 6/2014 |
| JP | 2018-020702 | 2/2018 |
| WO | 2018/061905 | 4/2018 |

\* cited by examiner

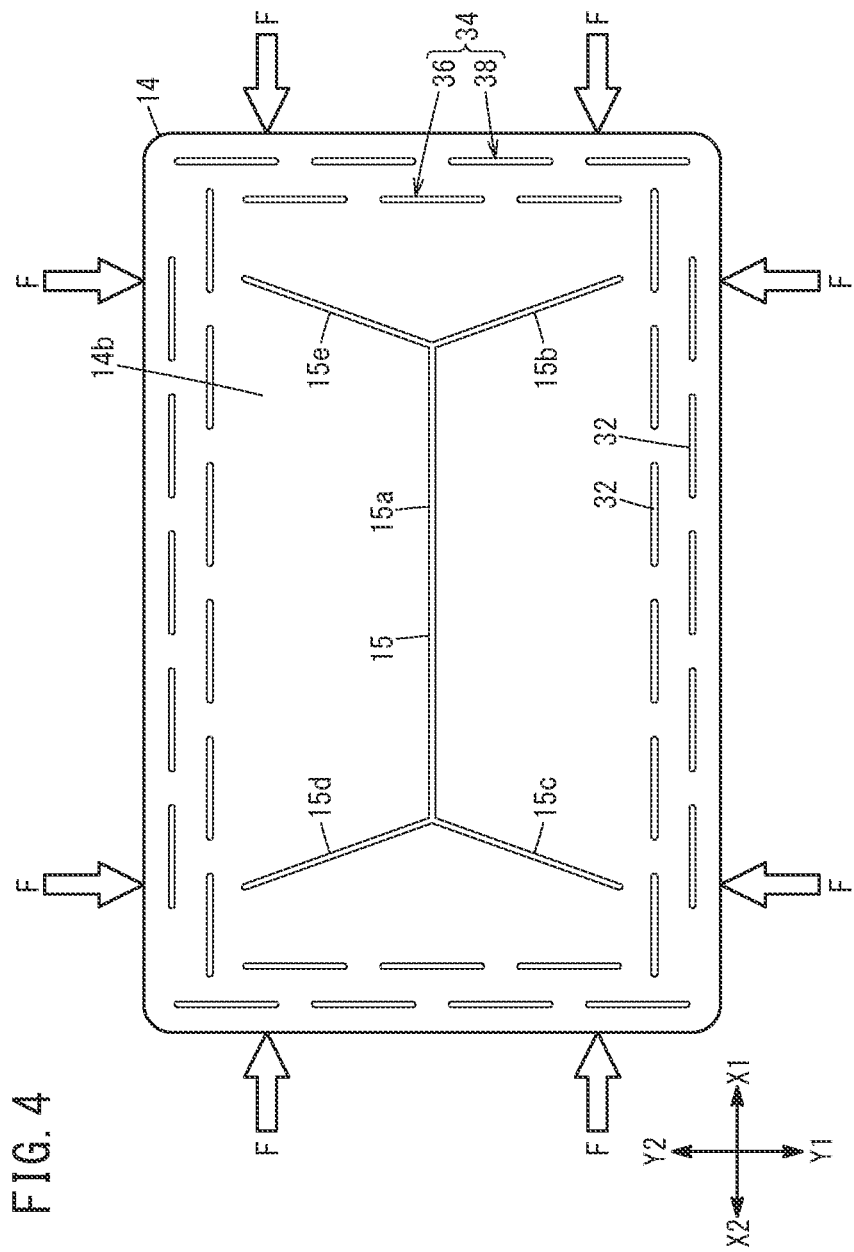

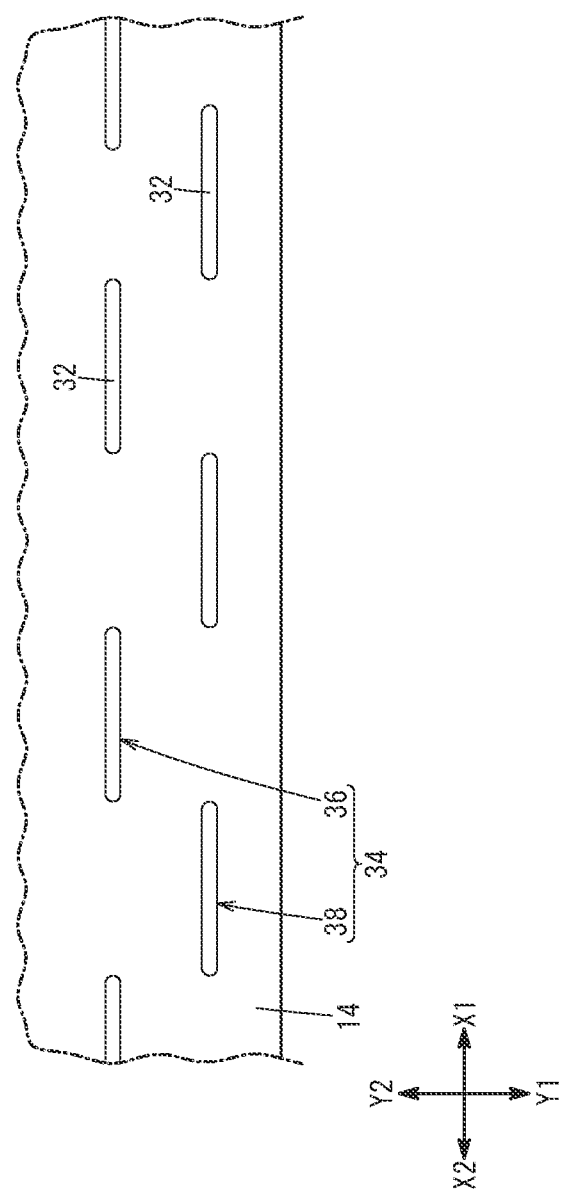

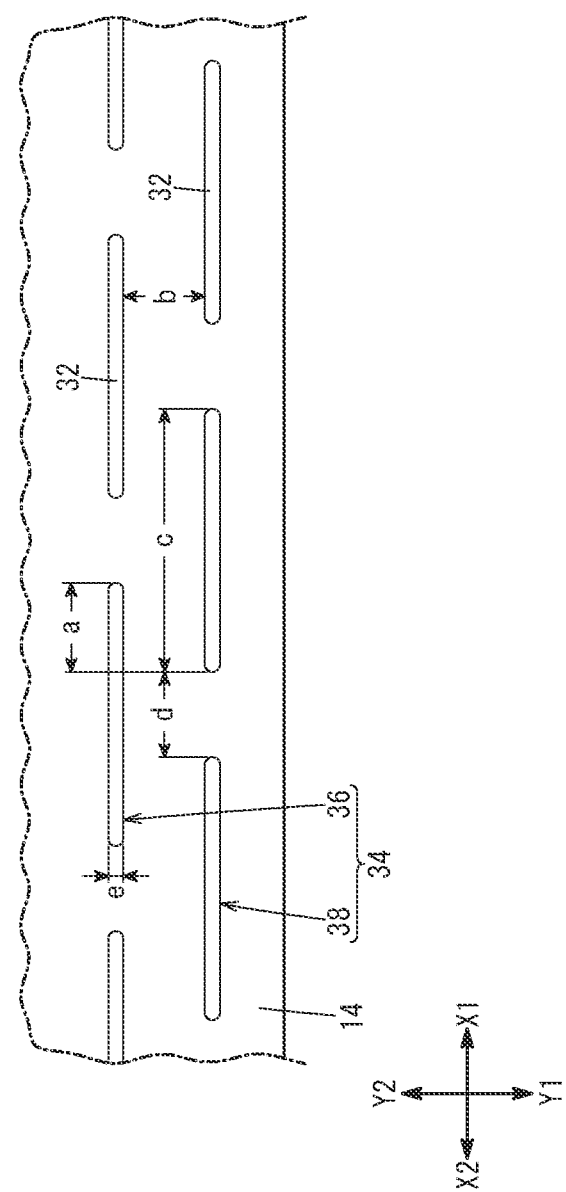

INSTRUMENT PANEL AND METHOD FOR MANUFACTURING INSTRUMENT PANEL

TECHNICAL FIELD

The present invention relates to an instrument panel to be provided to a vehicle, for example, and a method for manufacturing the instrument panel.

BACKGROUND ART

Japanese Laid-Open Patent Publication No. 09-226413 discloses an instrument panel that comprises: an instrument panel substrate (a base material portion); and an air bag door substrate which is disposed overlying the instrument panel substrate, and faces an air bag.

In Japanese Laid-Open Patent Publication No. 09-226413, the air bag door substrate includes: an air bag door (a deployment portion) on one end side of which a tear line is formed; and a hinge configured by a ball groove and a projection formed substantially parallel to the tear line on the other end side of the air bag door.

SUMMARY OF INVENTION

In Japanese Laid-Open Patent Publication No. 09-226413, there has been a problem that, when the air bag inflates, the tear line tears, and the air bag door deploys in a singly-swinging manner due to action of the hinge, hence the air bag door cannot be stably deployed.

A main object of the present invention is to provide an instrument panel that enables a deployment portion to be stably deployed.

Another object of the present invention is to provide a method for manufacturing the above-described instrument panel.

A first aspect of the present invention is an instrument panel comprising: a base material portion; and a deployment portion which is surrounded by the base material portion, faces an air bag, and includes a tear line, wherein the deployment portion has formed therein a slit structure including a plurality of slits that are arranged so as to surround the tear line.

A second aspect of the present invention is a method for manufacturing an instrument panel, the instrument panel comprising: a base material portion; and a deployment portion, which is configured from a different material from the base material portion, is surrounded by the base material portion, faces an air bag, and includes a tear line, the method comprising molding the base material portion provided with a holding portion that projects to an outer side of the air bag and is configured to hold a housing that houses the air bag, and the deployment portion having formed therein a slit structure including a plurality of slits that are arranged so as to surround the tear line, the base material portion and the deployment portion being molded as one body.

The present invention enables the deployment portion to be stably deployed.

BRIEF DESCRIPTION OF DRAWINGS

FIG. 4 is a view showing a state where the deployment portion is applied with a force from all sides due to thermal contraction during molding of the instrument panel;

FIG. 6 is a view showing a slit structure of working example 2;

FIG. 7 is a view showing a plurality of parameters for determining the slit structure formed in the deployment portion;

DESCRIPTION OF EMBODIMENTS

A preferred embodiment of an instrument panel and a method for manufacturing the instrument panel according to the present invention will be presented and described in detail below with reference to the accompanying drawings.

Figure 1:
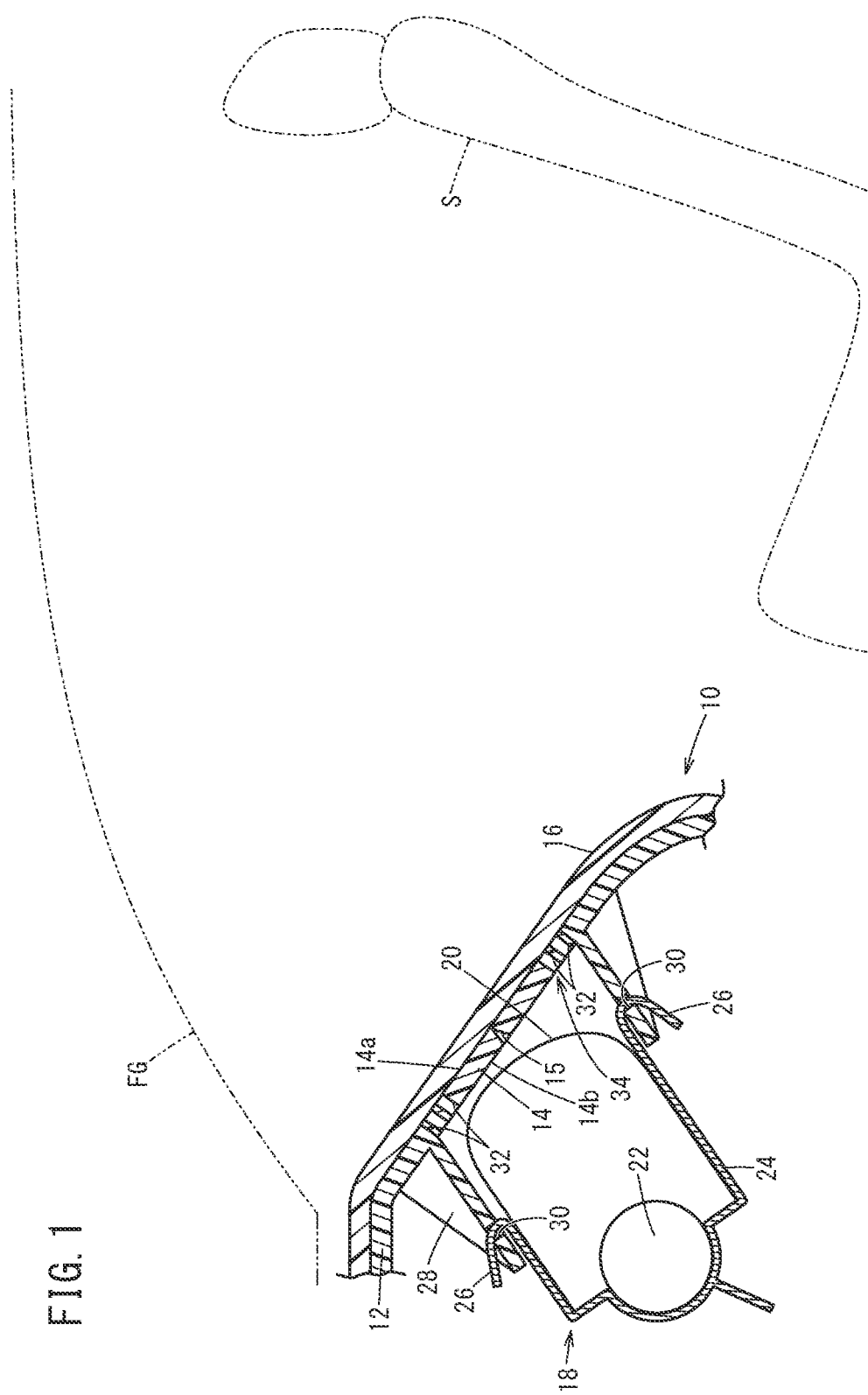
FIG. 1 is a cross-sectional view of an instrument panel according to the present embodiment.

FIG. 1 is a cross-sectional view showing an example of configuration of an instrument panel 10. The instrument panel 10 is installed in front of a driver's seat and a passenger seat S inside a vehicle. The cross-sectional view of FIG. 1 is a cross-sectional view taken at a position of the passenger seat S in a vehicle width direction. The symbol FG in FIG. 1 indicates a windshield of the vehicle.

As shown in FIG. 1, the instrument panel 10 comprises a base material portion 12, a deployment portion 14, and a skin 16.

The base material portion 12 occupies a majority of the instrument panel 10, and surrounds the deployment portion 14. As a configuring material of the base material portion 12, there may be cited polypropylene, for example.

The skin 16 covers the base material portion 12 and the deployment portion 14 from outside.

Figure 2:
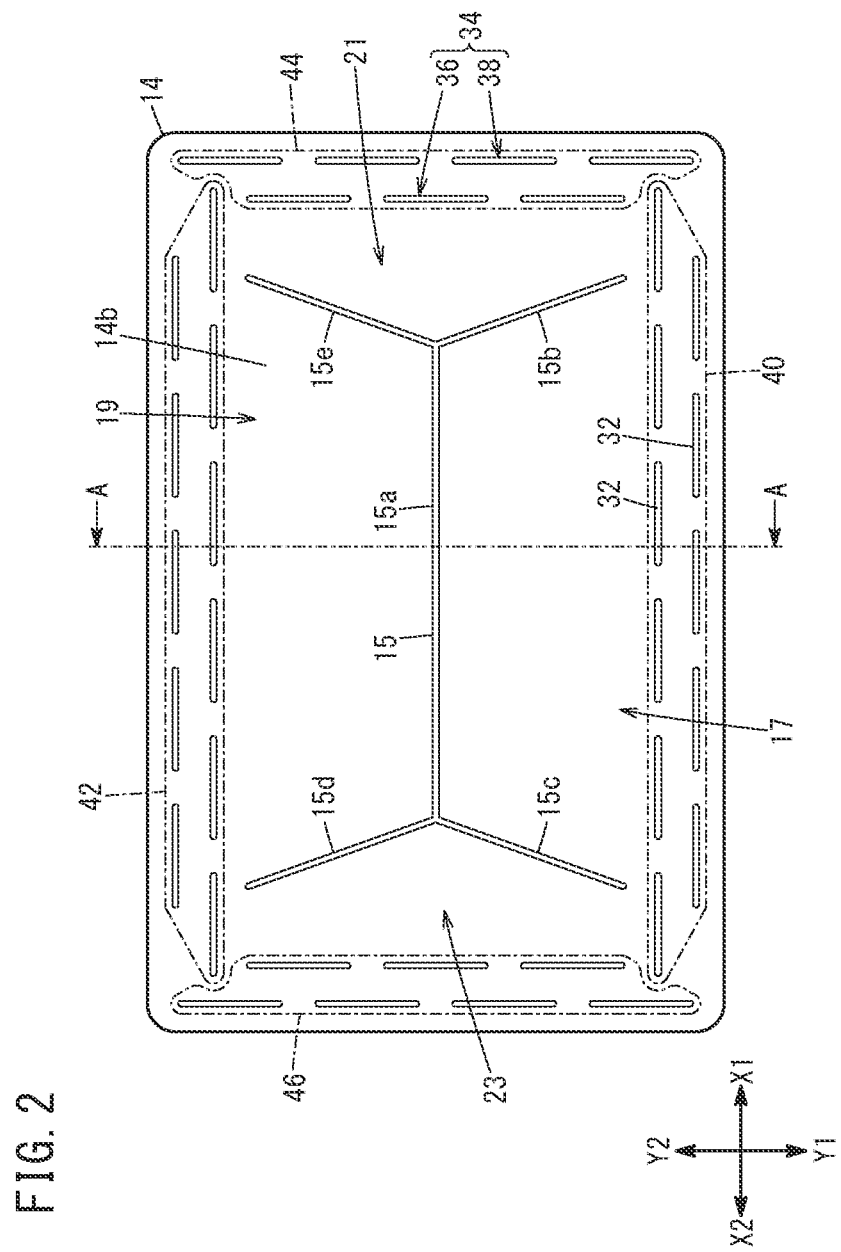
FIG. 2 is a plan view of a deployment portion of the instrument panel.

FIG. 2 is a plan view of the deployment portion 14 viewed from the side of an air bag 20. The cross section of the deployment portion 14 shown in FIG. 1 is a cross section taken along the line A-A of FIG. 2. As shown in FIGS. 1 and 2 as an example, the deployment portion 14 is configured from a rectangular plate-like member whose rigidity is lower than that of the base material portion 12. Specifically, the deployment portion 14 is formed in a substantially rectangular shape having a long axis lying along the vehicle width direction. The deployment portion 14 is provided in front of the passenger seat S. As a configuring material of the deployment portion 14, there may be cited an olefin-based thermoplastic elastomer, for example. Hereafter, a surface of the deployment portion 14 on a side facing the air bag 20 will be called an "inner surface 14b", and a surface on an opposite side to the inner surface 14b will be called an "outer surface 14a". As shown in FIG. 2, a long axis direction of the deployment portion 14 will be assumed to be an "X axis direction", and a short axis direction of the deployment portion 14 will be assumed to be a "Y axis direction". The X axis direction corresponds to the vehicle width direction. One side in the X axis direction will be assumed to be an X1 direction, and the other side in the X axis direction will be assumed to be an X2 direction. One side in the Y axis direction will be assumed to be a Y1 direction, and the other side in the Y axis direction will be assumed to be a Y2 direction. The inner surface 14b of the deployment portion 14 has formed therein a tear line 15 for deployment.

The base material portion 12 and the deployment portion 14 are molded as one body by injection molding. Specifically, in the present embodiment, the base material portion 12 and the deployment portion 14 are molded as one body by two-color molding (are molded as one body by different resin materials). Hence, in the method for manufacturing the instrument panel 10, the base material portion 12 provided with a holding portion 28, and the deployment portion 14 in which a slit structure 34 is formed, are molded as one body. That is, the base material portion 12 and the deployment portion 14 are molded using the same injection molding device (injection molding mold).

As shown in FIG. 2, the tear line 15 has a shape such that lower points of two Y shapes are connected, in plan view (viewed from a thickness direction of the deployment portion 14). Two Y-shaped portions of the tear line 15 are arranged in the X axis direction. The tear line 15 is configured by five straight-line portions 15a to 15e. The straight-line portion 15a extends in the X axis direction at a center in the Y axis direction of the deployment portion 14. The straight-line portion 15b is inclined with respect to the straight-line portion 15a, and extends to an X1 side and a Y1 side from an end portion on the X1 side of the straight-line portion 15a. An inclination angle of the straight-line portion 15b with respect to the X axis direction is larger than an inclination angle of the straight-line portion 15b with respect to the Y axis direction. The straight-line portion 15c is inclined with respect to the straight-line portion 15a, and extends to an X2 side and the Y1 side from an end portion on the X2 side of the straight-line portion 15a. An inclination angle of the straight-line portion 15c with respect to the X axis direction is larger than an inclination angle of the straight-line portion 15c with respect to the Y axis direction. The straight-line portion 15d is inclined with respect to the straight-line portion 15a, and extends to the X2 side and a Y2 side from the end portion on the X2 side of the straight-line portion 15a. An inclination angle of the straight-line portion 15d with respect to the X axis direction is larger than an inclination angle of the straight-line portion 15d with respect to the Y axis direction. The straight-line portion 15e is inclined with respect to the straight-line portion 15a, and extends to the X1 side and the Y2 side from the end portion on the X1 side of the straight-line portion 15a. An inclination angle of the straight-line portion 15e with respect to the X axis direction is larger than an inclination angle of the straight-line portion 15e with respect to the Y axis direction. The above-mentioned inclination angles with respect to the X axis direction and inclination angles with respect to the Y axis direction of each of the straight-line portions other than the straight-line portion 15a of the tear line 15 are all acute angles. The tear line 15 has a shape which is symmetrical about a straight line including the straight-line portion 15a and extending in the X axis direction, and has a shape which is symmetrical about a straight line passing through a center point of the straight-line portion 15a and extending in the Y axis direction. The tear line 15 may include a non-straight-line portion. For example, the end portion on the X1 side of the straight-line portion 15a may be provided with circular arc-shaped portions curved convexly toward a center of the deployment portion 14, instead of the straight-line portions 15b, 15e. The end portion on the X2 side of the straight-line portion 15a may be provided with circular arc-shaped portions curved convexly toward the center of the deployment portion 14, instead of the straight-line portions 15c, 15d.

The deployment portion 14 is divided into four deployment regions (a long-side side first deployment region 17, a long-side side second deployment region 19, a short-side side first deployment region 21, and a short-side side second deployment region 23) by the tear line 15. The long-side side first deployment region 17 is defined by the straight-line portions 15a, 15b, 15c. The long-side side second deployment region 19 is defined by the straight-line portions 15a, 15d, 15e. The short-side side first deployment region 21 is defined by the straight-line portions 15b, 15e. The short-side side second deployment region 23 is defined by the straight-line portions 15c, 15d.

As shown in FIG. 1, the straight-line portions of the tear line 15 are each a cross-sectionally triangular-shaped (V-shaped) groove (a groove that narrows toward the outer surface 14a).

On a lower side of the deployment portion 14 (inside the instrument panel 10), there is arranged an air bag device 18 for the passenger seat S. The air bag device 18 includes the air bag 20, an inflator 22, and a housing 24.

The housing 24 is configured from a bottomed cylindrical member that opens on the deployment portion 14 side. Hook portions 26 projecting outwardly are provided on a plurality of places in a circumferential direction of an end portion of a side wall of the housing 24 on the deployment portion 14 side.

The housing 24 is held by the holding portion 28 which is ring-shaped and projects from the base material portion 12. Describing in detail, the holding portion 28 projects toward the air bag device 18 side and an outer side of the housing 24, from a place adjacent to the deployment portion 14, of an inner surface of the base material portion 12 (a surface on an interior side of the instrument panel 10). The holding portion 28 is formed in the shape of a ring lying along an outer peripheral portion of the deployment portion 14. Hence, in the present embodiment, the holding portion 28 is formed in a square ring shape. The holding portion 28 includes, at a plurality of places in a circumferential direction thereof, through-holes 30 that correspond to each of the hook portions 26. The hook portions 26 are each caught in their corresponding through-hole 30.

The inflator 22 is a device that supplies a gas to the air bag 20 to inflate the air bag 20. The inflator 22 is housed in the housing 24 so as to be positioned on a bottom surface of the housing 24. The inflator 22 actuates when the vehicle is applied with an impact.

The air bag 20 is housed in the housing 24 so as to be positioned between the deployment portion 14 and the inflator 22. That is, the air bag 20 faces the deployment portion 14. The air bag 20 is connected to a gas supply port of the inflator 22.

Now, as shown in FIG. 2, the deployment portion 14 has formed therein the slit structure 34 which has a plurality of slits 32 that are arranged so as to surround the tear line 15. Specifically, the slit structure 34 is formed in the outer peripheral portion of the deployment portion 14 that surrounds the tear line 15. Here, each of the slits 32 is an elongated through-hole (a long hole) penetrating the deployment portion 14 (refer to FIGS. 1 and 2). A penetrating direction of each of the slits 32 is a thickness direction of the deployment portion 14. Here, lengths of the slits 32 are the same, but may differ, and widths of the slits 32 are the same, but may differ. The outer peripheral portion of the deployment portion 14 is configured with low rigidity (so as to easily deform) due to the slit structure 34.

The slit structure 34 has a plurality of (for example, two) slit groups 36, 38 whose sizes differ from each other. The plurality of slit groups 36, 38 are each formed such that at least two of the slits 32 continuously make one round of the tear line 15. Of the adjacent ones of the slit groups 36, 38, the slit group 38 which is larger in terms of an overall outer shape surrounds the slit group 36 which is smaller in terms of the outer shape. Here, the outer shapes of the two slit groups 36, 38 are both rectangular overall. More specifically, the two slit groups 36, 38 are both of a rectangular shape having a long axis lying along the vehicle width direction (the X axis direction).

Each of the slits 32 of the plurality of slit groups 36, 38 extends along an outer peripheral direction of the deployment portion 14. Specifically, the slits 32 formed on both sides of the outer peripheral portion of the deployment portion 14 in the short axis direction of the deployment portion 14 (the Y1 side and the Y2 side) each extend linearly along the long axis direction of the deployment portion 14 (the X axis direction). The slits 32 formed on both sides of the outer peripheral portion of the deployment portion 14 in the long axis direction of the deployment portion 14 (the X1 side and the X2 side) each extend linearly along the short axis direction of the deployment portion 14 (the Y axis direction).

The slit 32 of one of the slit groups, that is, the slit group 36, of the adjacent slit groups 36, 38 partially faces the slit 32 of the other of the slit groups, that is, the slit group 38, in a direction orthogonal to the outer peripheral direction of the deployment portion 14. That is, the slits 32 of the slit group 36 and the slits 32 of the slit group 38 partially overlap (this case will be assumed to be working example 1). As a result, the outer peripheral portion of the deployment portion 14 is configured with sufficiently low rigidity.

Now, as shown in FIG. 2, an aggregate configured from the plurality of slits 32 formed along one long side (the long side on the Y1 side) of the outer peripheral portion of the deployment portion 14 will be called a long-side side first slit aggregate 40. An aggregate configured from the plurality of slits 32 formed along the other long side (the long side on the Y2 side) of the outer peripheral portion of the deployment portion 14 will be called a long-side side second slit aggregate 42. An aggregate configured from the plurality of slits 32 formed along one short side (the short side on the X1 side) of the outer peripheral portion of the deployment portion 14 will be called a short-side side first slit aggregate 44. An aggregate configured from the plurality of slits 32 formed along the other short side (the short side on the X2 side) of the outer peripheral portion of the deployment portion 14 will be called a short-side side second slit aggregate 46.

Figure 3:
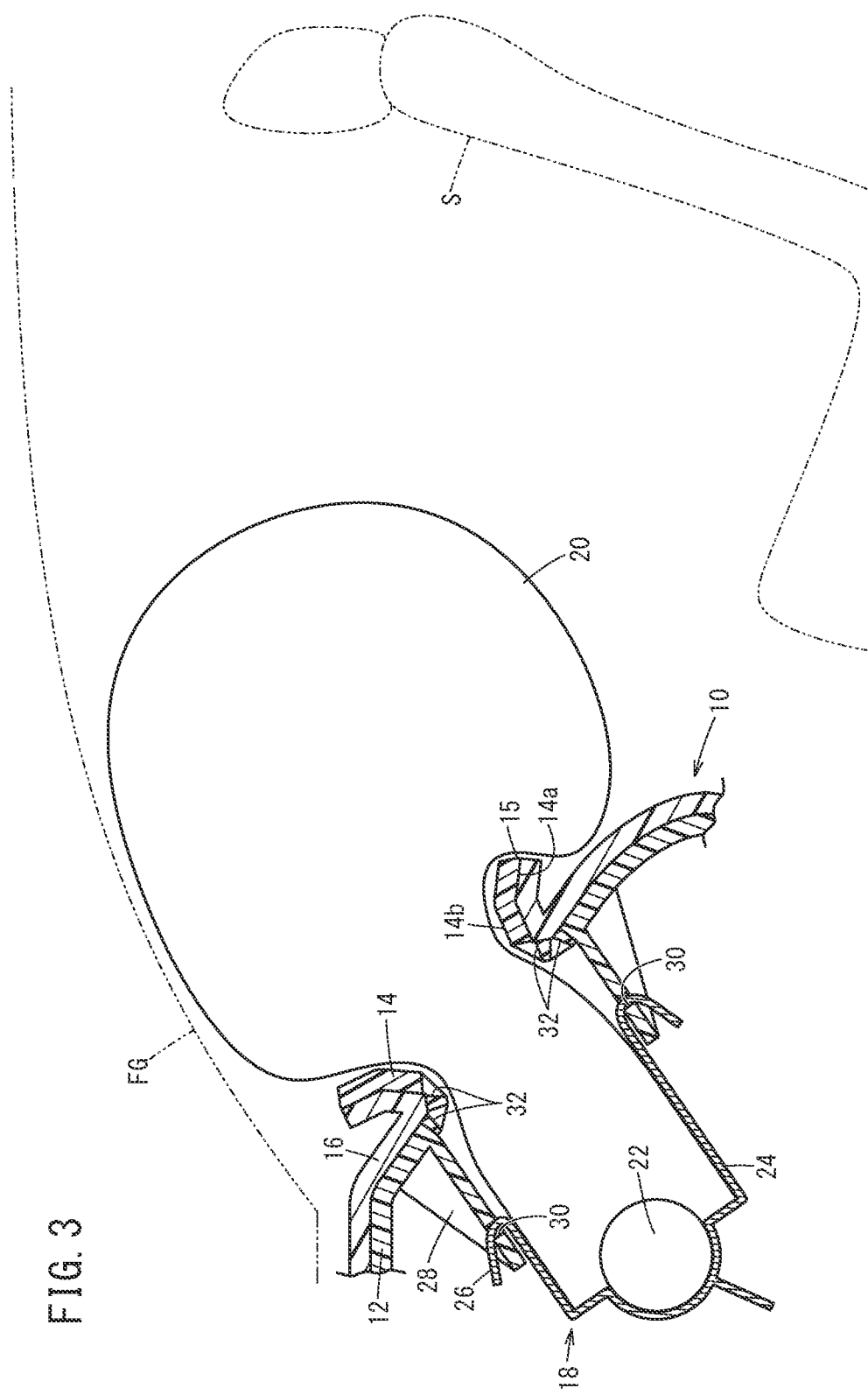
FIG. 3 is a view showing a state where the deployment portion has deployed by an air bag inflating.

In the instrument panel 10 configured as above, when the vehicle is applied with an impact, the inflator 22 actuates and the air bag 20 inflates, as shown in FIG. 3. At this time, the deployment portion 14 is pressed by the inflated air bag 20, whereby the tear line 15 tears, and the deployment portion 14 deploys. During this deployment, the long-side side first deployment region 17, the long-side side second deployment region 19, the short-side side first deployment region 21, and the short-side side second deployment region 23 that are shown in FIG. 2 each deploy. Specifically, the long-side side first deployment region 17 deploys outwardly by rotating with the long-side side first slit aggregate 40 as its axis (fulcrum). The long-side side second deployment region 19 deploys outwardly by rotating with the long-side side second slit aggregate 42 as its axis (fulcrum). The short-side side first deployment region 21 deploys outwardly by rotating with the short-side side first slit aggregate 44 as its axis (fulcrum). The short-side side second deployment region 23 deploys outwardly by rotating with the short-side side second slit aggregate 46 as its axis (fulcrum). Thus, in the instrument panel 10, the deployment portion 14 can stably deploy uniformly in all directions during inflation of the air bag 20. As a result, the air bag 20 can be stably delivered to a desired spatial region (a spatial region in front of the passenger seat S) in the vehicle.

In FIGS. 1 and 3, in the instrument panel 10, the base material portion 12 provided with the holding portion 28, and the deployment portion 14, are two-color molded as mentioned above. That is, the base material portion 12 and the holding portion 28 are of the same material, and the material of the deployment portion 14 is of lower rigidity than the material of the base material portion 12 and holding portion 28. As a result, the housing 24 can be stably held by the holding portion 28 when the inflated air bag 20 presses the deployment portion 14, so the deployment portion 14 can be easily and stably deployed.

Figure 5A:
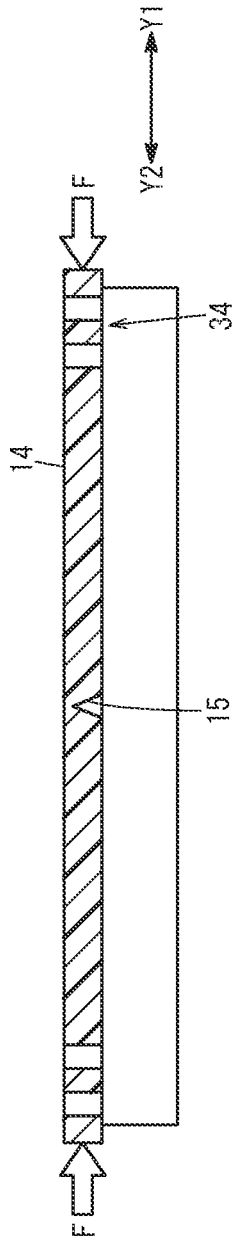
FIG. 5A is a view showing a state of a deployment portion during molding (during thermal contraction) of an instrument panel of working example 1 of the present embodiment.

As shown in FIG. 2, the slit 32 of one of the slit groups, that is, the slit group 36, of the adjacent slit groups 36, 38 partially faces the slit 32 of the other of the slit groups, that is, the slit group 38, in the direction orthogonal to the outer peripheral direction of the deployment portion 14. As a result, the outer peripheral portion of the deployment portion 14 is configured with sufficiently low rigidity. Therefore, even if, due to thermal contraction during two-color molding of the instrument panel 10, a force F from the base material portion 12 side with high rigidity toward the deployment portion 14 side with low rigidity acts as shown in FIG. 4, that force F can be sufficiently absorbed by the slit structure 34. As a result, as shown in FIG. 5A, it can be suppressed that the deployment portion 14 deforms so as to protrude in a streak shape along the tear line 15.

Figure 5B:
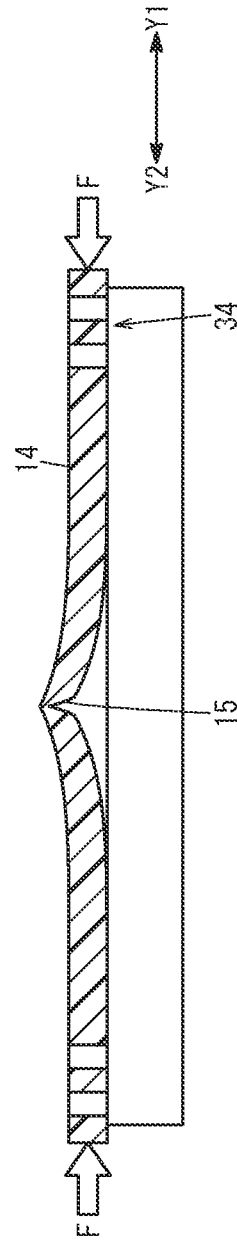
FIG. 5B is a view showing a state of a deployment portion during molding (during thermal contraction) of an instrument panel of working example 2 of the present embodiment.

In the case where, as shown in FIG. 6, the slit 32 of one of the slit groups, that is, the slit group 36 does not partially face the slit 32 of the other of the slit groups, that is, the slit group 38, in the direction orthogonal to the outer peripheral direction of the deployment portion 14 (this case will be assumed to be working example 2), the slit structure 34 will not achieve a particularly low rigidity, and the above-described force F will not be able to be sufficiently absorbed by the slit structure 34. As a result, as shown in FIG. 5B, the deployment portion 14 will end up deforming so as to slightly protrude in a streak shape along the tear line 15.

Figure 5C:
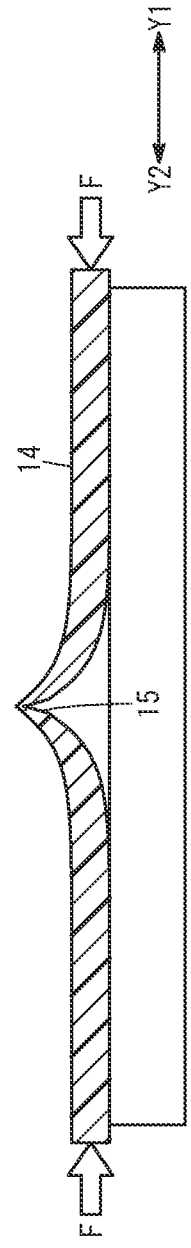
FIG. 5C is a view showing a state of a deployment portion during molding (during thermal contraction) of an instrument panel of a comparative example.

In the case where, as a comparative example, as shown in FIG. 5C, the deployment portion 14 is not provided with the slit structure 34, the above-described force F will be hardly able to be absorbed by the deployment portion 14. As a result, the deployment portion 14 will end up deforming so as to greatly protrude in a streak shape along the tear line 15.

FIG. 7 is a view showing a plurality of (for example, five) parameters (a, b, c, d, e) for determining the slit structure 34 formed in the deployment portion 14. a is an amount of the above-described overlapping. b is a distance between the two slit groups 36, 38. c is a length of each of the slits 32. d is an interval of adjacent slits 32 of each of the slit groups. e is a width of each of the slits 32. By experiment, the following has been found. That is, it has been found that the larger a is, the lower rigidity of the outer peripheral portion of the deployment portion 14 can be made. It has been found that the shorter b is, the lower rigidity of the outer peripheral portion of the deployment portion 14 can be made. It has been found that the longer c is, the lower rigidity of the outer peripheral portion of the deployment portion 14 can be made. It has been found that the smaller d is, the lower rigidity of the outer peripheral portion of the deployment portion 14 can be made. It has been found that the larger e is, the lower rigidity of the outer peripheral portion of the deployment portion 14 can be made. By setting a, b, c, d, e to appropriate values, rigidity of the outer peripheral portion of the deployment portion 14 can be set to a desired level.

MODIFIED EXAMPLES

Modified Example 1

In the above-described embodiment, the slits 32 each extend along the outer peripheral direction of the deployment portion 14. However, the present invention is not limited to this. At least one slit 32 may extend in a direction intersecting the outer peripheral direction of the deployment portion 14. Describing in detail, the slits 32 of the long-side side first slit aggregate 40 and the long-side side second slit aggregate 42 may each extend in a direction intersecting the X axis direction. The slits 32 of the short-side side first slit aggregate 44 and the short-side side second slit aggregate 46 may each extend in a direction intersecting the Y axis direction.

Modified Example 2

In the above-described embodiment and modified example 1, the slit structure 34 has two slit groups 36, 38, which each make one round of the tear line 15, and the larger of which surrounds the smaller. However, the present invention is not limited to this. The slit structure 34 may have a single slit group that makes one round of the tear line 15. The slit structure 34 may have three or more slit groups, which each make one round of the tear line 15, and the larger ones of which surround the smaller ones.

Modified Example 3

In the above-described embodiment and each of modified examples, the slit 32 of one of the slit groups, that is, the slit group 36, of the adjacent slit groups 36, 38 partially faces the slit 32 of the other of the slit groups, that is, the slit group 38, in the direction orthogonal to the outer peripheral direction of the deployment portion 14. However, the present invention is not limited to this. For example, the slit 32 of one of the slit groups, that is, the slit group 36, of the adjacent slit groups 36, 38 may wholly face, or may not face at all the slit 32 of the other of the slit groups, that is, the slit group 38, in the direction orthogonal to the outer peripheral direction of the deployment portion 14.

Modified Example 4

In the above-described embodiment and each of modified examples, the base material portion 12 and the holding portion 28 are one body, but may be separate bodies.

Modified Example 5

In the above-described embodiment and each of modified examples, the base material portion 12 and the deployment portion 14 are one body, but may be separate bodies.

Modified Example 6

In the above-described embodiment and each of modified examples, materials of the base material portion 12 and the holding portion 28 are the same, but may differ.

Modified Example 7

Figure 9:
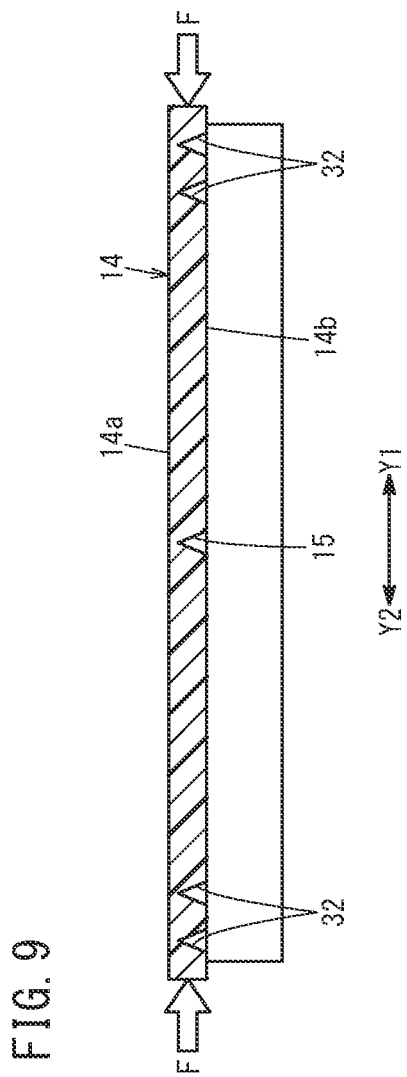
FIG. 9 is a cross-sectional view of a deployment portion of modified example 7.

In the above-described embodiment and each of modified examples, the slits 32 of the slit structure 34 are each configured as a through-hole (for example, a long hole). However, the present invention is not limited to this. For example, as shown in FIG. 9, the slits 32 may each be configured as a groove formed on the inner surface 14b of the deployment portion 14 and having a triangular (V-shaped) cross section (a groove that narrows toward the outer surface 14a). The slits 32 may each be configured as a groove whose cross section is a shape other than a triangular shape. Some of the slits 32 may be configured as grooves, and the other ones of the slits 32 may be configured as through-holes (for example, long holes).

Modified Example 8

Figure 8:
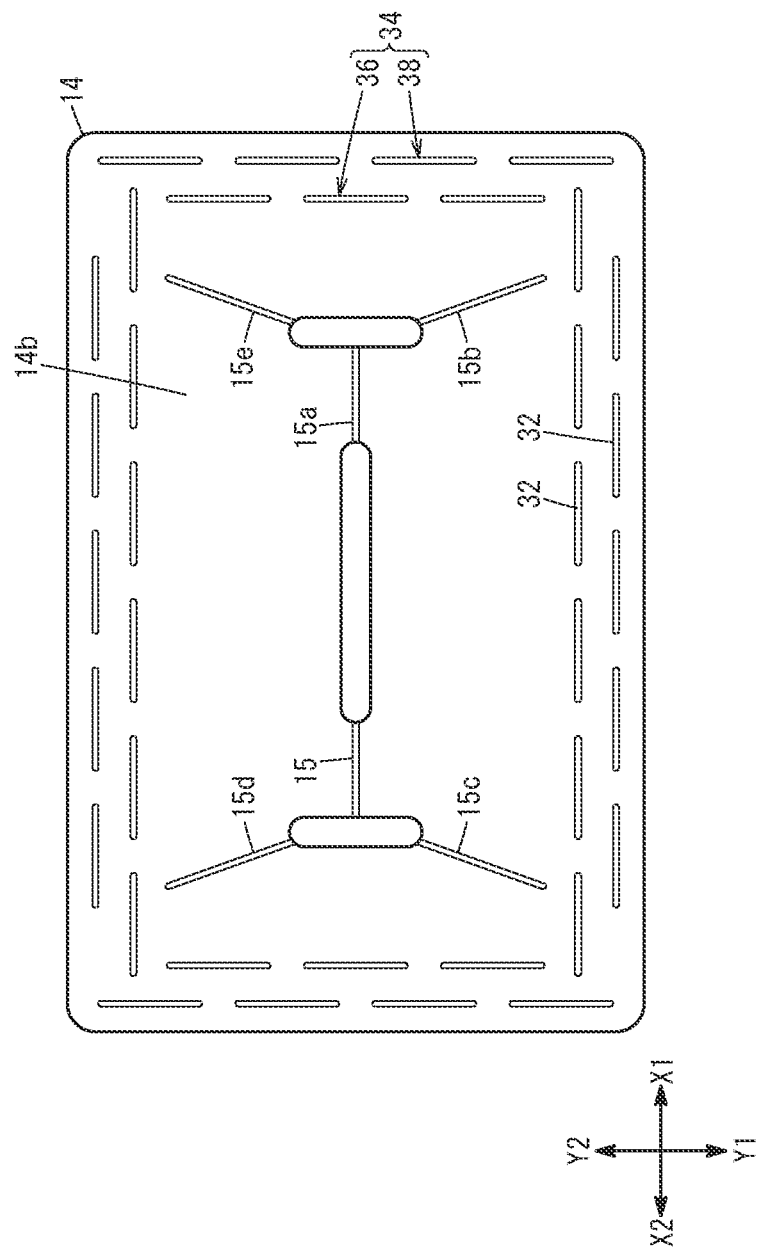
FIG. 8 is view showing a modified example of a tear line.

Configuration of the tear line 15 may be appropriately altered. A cross-sectional shape of the groove configuring the tear line 15 may be a shape other than a triangle. The whole of the tear line 15 may be configured by a through-hole (for example, a long hole). Part of the tear line 15 may be configured by a groove, and another part of the tear line 15 may be configured by a through-hole (for example, a long hole) (refer to FIG. 8). In the tear line 15 of FIG. 8, the blank outlined portions are through-holes, and the portions other than those blank outlined portions are grooves.

Modified Example 9

An overall shape of each of the two slit groups 36, 38 is not limited to a rectangle, and, basically, need only be a shape surrounding the tear line 15.

Modified Example 10

Modified examples 1 to 9 may be combined appropriately within a non-contradictory range.

Inventions Comprehensible from Embodiment and Modified Examples 1 to 10

A first invention is an instrument panel (10) comprising: a base material portion (12); and a deployment portion (14) which is surrounded by the base material portion (12), faces an air bag (20), and includes a tear line (15), wherein the deployment portion (14) has formed therein a slit structure (34) including a plurality of slits (32) that are arranged so as to surround the tear line (15).

As a result, when the deployment portion (14) that has been pressed by the inflated air bag (20) deploys (tears from the tear line (15)), the deployment portion (14) rotates with the plurality of slits (32) as its fulcrum, hence the deployment portion (14) can be stably deployed.

The plurality of slits (32) may each extend along an outer peripheral direction of the deployment portion (14). As a result, the deployment portion (14) can be rotated (deployed) with the outer peripheral direction of the deployment portion (14) as its axial direction.

The slit structure (34) may be provided so as to make one round of the tear line (15). As a result, the deployment portion (14) can be uniformly deployed.

The slit structure (34) may include a plurality of slit groups (36, 38) whose sizes differ from each other, the plurality of slit groups (36, 38) may each be formed in a manner that at least two of the slits (32) make one round of the tear line (15), and, of adjacent ones of the slit groups (36, 38), the slit group (38), which is larger, may surround the slit group (36), which is smaller. As a result, the deployment portion (14) can be made easily deformed (easily deployed).

The slit (32) of one of the slit groups (36), of the adjacent ones of the slit groups (36, 38), may partially face the slit (32) of another of the slit groups (38), of the adjacent ones of the slit groups (36, 38), in a direction orthogonal to the outer peripheral direction of the deployment portion (14). Hence, a deformation amount of the deployment portion (14) can be increased (the deployment portion (14) can be made more easily deformed). As a result, deployment of the deployment portion (14) can be stabilized. Moreover, since contraction of the base material portion (12) during molding of the instrument panel (10) can be absorbed by the slit structure (34), deformation of the deployment portion (14) can be prevented.

The deployment portion (14) may have lower rigidity than the base material portion (12), the instrument panel (10) may further comprise a holding portion (28) that projects from an inner surface of the base material portion (12) to an outer side of the air bag (20), and holds a housing (24) that houses the air bag (20), and the holding portion (28) and the base material portion (12) may be one body. As a result, the housing (24) can be firmly held, and, consequently, it can be made easier for deployment characteristics of the deployment portion (14) to be exhibited. Moreover, since the holding portion (28) and the base material portion (12) are provided as one body, stability of the housing (24) with respect to the instrument panel (10) can be maintained during deployment of the deployment portion (14).

A second invention is a method for manufacturing an instrument panel (10), the instrument panel (10) comprising: a base material portion (12); and a deployment portion (14) which is configured from a different material from the base material portion (12), is surrounded by the base material portion (12), faces an air bag (20), and includes a tear line (15), the method comprising molding the base material portion (12) provided with a holding portion (28) that projects to an outer side of the air bag (20) and is configured to hold a housing (24) that houses the air bag (20), and the deployment portion (14) having formed therein a slit structure (34) including a plurality of slits (32) that are arranged so as to surround the tear line (15), the base material portion and the deployment portion being molded as one body.

As a result, the instrument panel (10) comprising the base material portion (12) including the holding portion (28) and the deployment portion (14) including the tear line (15) and the slit structure (34), can be efficiently manufactured. Moreover, since the holding portion (28) and the base material portion (12) are provided as one body, stability of the housing (24) with respect to the instrument panel (10) can be maintained during deployment of the deployment portion (14).

REFERENCE SIGNS LIST

10: instrument panel
12: base material portion
14: deployment portion
15: tear line
20: air bag
24: housing
28: holding portion
32: slit
34: slit structure
36, 38: slit groups

What is claim is:

1. An instrument panel comprising:
a base material portion; and
a deployment portion which is surrounded by the base material portion, faces an air bag, and includes a tear line,
wherein the deployment portion has formed therein a slit structure including a plurality of slits that are arranged so as to surround the tear line,
the plurality of slits each extend along an outer peripheral direction of the deployment portion,
the slit structure includes a plurality of slit groups whose sizes differ from each other,
the plurality of slit groups are each formed in a manner that at least two of the slits make one round of the tear line, and
of adjacent ones of the slit groups, the slit group which is larger surrounds the slit group which is smaller.

2. The instrument panel according to claim 1, wherein the slit of one of the slit groups, of the adjacent ones of the slit groups, partially faces the slit of another of the slit groups, of the adjacent ones of the slit groups, in a direction orthogonal to an outer peripheral direction of the deployment portion.

3. The instrument panel according to claim 1, wherein the deployment portion has lower rigidity than the base material portion,
the instrument panel further comprises a holding portion projecting from an inner surface of the base material portion to an outer side of the air bag, and configured to hold a housing that houses the air bag, and
the holding portion and the base material portion are one body.

4. A method for manufacturing an instrument panel, the instrument panel comprising:
a base material portion; and
a deployment portion, which is configured from a different material from the base material portion, is surrounded by the base material portion, faces an air bag, and includes a tear line,
the method comprising:
molding the base material portion provided with a holding portion that projects to an outer side of the air bag and is configured to hold a housing that houses the air bag, and the deployment portion having formed therein a slit structure including a plurality of slits that are arranged so as to surround the tear line, the base material portion and the deployment portion being molded as one body;
forming the plurality of slits each extending along an outer peripheral direction of the deployment portion;
providing the slit structure including a plurality of slit groups whose sizes differ from each other; and
forming each of the plurality of slit groups in a manner that at least two of the slits make one round of the tear line, wherein of adjacent ones of the slit groups, the slit group which is larger surrounds the slit group which is smaller.

* * * * *